US011222353B1

(12) United States Patent
Chang et al.

(10) Patent No.: US 11,222,353 B1
(45) Date of Patent: Jan. 11, 2022

(54) VIRTUAL PUNCH CARD

(71) Applicant: Wells Fargo Bank, N.A., San Francisco, CA (US)

(72) Inventors: Laura Chang, Wilmington, DE (US); Jay Das, West Chester, PA (US); Nick Gambale, San Francisco, CA (US); Heath Hinkhouse, Urbandale, IA (US); David Jacobs, San Francisco, CA (US); Priya Ramakrishnan, Dublin, CA (US); Matthew S. Rogers, Hoboken, NJ (US); Marc J. Skurla, San Francisco, CA (US); Brian Winn, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 626 days.

(21) Appl. No.: 15/808,621

(22) Filed: Nov. 9, 2017

Related U.S. Application Data

(60) Provisional application No. 62/440,186, filed on Dec. 29, 2016.

(51) Int. Cl.
*G06Q 30/02* (2012.01)
*G06Q 20/32* (2012.01)
(Continued)

(52) U.S. Cl.
CPC ..... *G06Q 30/0233* (2013.01); *G06F 3/04842* (2013.01); *G06F 3/04847* (2013.01); *G06Q 20/3274* (2013.01); *G06Q 20/36* (2013.01)

(58) Field of Classification Search
CPC ............... G06Q 30/02; G06Q 30/0233; G06Q 20/3274; G06Q 20/36; G06F 3/04842; G06F 3/04847
See application file for complete search history.

(56) References Cited

U.S. PATENT DOCUMENTS 9,367,855 B2 * 6/2016 Williams ........... G06Q 30/0226
9,767,474 B1 * 9/2017 Ramalingam ........ G06Q 20/229
(Continued)

OTHER PUBLICATIONS

Anonymous, Getting Your Loyalty Program in Gear, NPN, National Petroleum News; Nov. 2000; 92, 12; ProQuest Technology Collection, p. 32.
(Continued)

*Primary Examiner* — Thuy N Nguyen
(74) *Attorney, Agent, or Firm* — Foley & Lardner LLP

(57) ABSTRACT

A virtual punch card rewards system is described. The system includes a user database that stores user information concerning a plurality of users, a network interface configured to communicate data over a network, and a processing circuit comprising a processor and memory. The memory is structured to store instructions that are executable by the processor and cause the processing circuit to receive transaction information concerning a payment account belonging to a user, determine a reward category for the user based on the retrieved transaction information, generate virtual punch card parameters for the user based on the determined reward category, and transmit, by the network interface over the network, virtual punch card content to a computing device associated with the user, the virtual punch card content including a first graphical interface configured to present the user with at least one of the generated virtual punch card parameters.

15 Claims, 9 Drawing Sheets

(51) Int. Cl.
*G06F 3/0484* (2013.01)
*G06Q 20/36* (2012.01)

(56) References Cited

U.S. PATENT DOCUMENTS

| | | | |
|---|---|---|---|
| 9,799,047 B2* | 10/2017 | Goldfinger | G06Q 20/20 |
| 10,257,651 B1* | 4/2019 | Thompson | H04W 4/025 |
| 2002/0046116 A1* | 4/2002 | Hohle | G06Q 20/10 |
| | | | 705/14.27 |
| 2007/0156530 A1* | 7/2007 | Schmitt | G06Q 30/0215 |
| | | | 705/14.17 |
| 2010/0088188 A1 | 4/2010 | Kumar et al. | |
| 2011/0093325 A1 | 4/2011 | Kelsky et al. | |
| 2012/0059730 A1 | 3/2012 | Jensen | |
| 2012/0185312 A1 | 7/2012 | Nix et al. | |
| 2012/0246004 A1 | 9/2012 | Book et al. | |
| 2012/0271692 A1 | 10/2012 | Huang et al. | |
| 2012/0296716 A1* | 11/2012 | Barbeau | G06Q 30/02 |
| | | | 705/14.13 |
| 2013/0262198 A1 | 10/2013 | Chung | |
| 2013/0262212 A1* | 10/2013 | Shevelenko | G06Q 30/02 |
| | | | 705/14.27 |
| 2013/0262216 A1* | 10/2013 | Zhang | G06Q 30/02 |
| | | | 705/14.36 |
| 2014/0032299 A1 | 1/2014 | Doka et al. | |
| 2014/0052524 A1 | 2/2014 | Andersen | |
| 2014/0172534 A1* | 6/2014 | Spears | G06Q 30/0226 |
| | | | 705/14.27 |
| 2014/0172577 A1 | 6/2014 | Rephlo | |
| 2014/0244409 A1 | 8/2014 | Nathanel et al. | |
| 2014/0278978 A1 | 9/2014 | O'Connor et al. | |
| 2014/0372198 A1* | 12/2014 | Goldfinger | G06Q 30/0201 |
| | | | 705/14.33 |
| 2015/0220999 A1* | 8/2015 | Thornton | H04M 15/8011 |
| | | | 705/14.66 |
| 2015/0348083 A1* | 12/2015 | Brill | G06Q 20/386 |
| | | | 705/14.23 |
| 2016/0086212 A1* | 3/2016 | Tietzen | G06Q 30/0226 |
| | | | 705/14.27 |
| 2016/0314451 A1* | 10/2016 | Martin | G06Q 20/405 |
| 2016/0343016 A1* | 11/2016 | Joshi | G06Q 20/387 |

OTHER PUBLICATIONS

Punch Card Replacement is a Question of Loyalty, EFT Report, Dec. 1, 1999, vol. 22, Issue 24, 3 pages.

* cited by examiner

VIRTUAL PUNCH CARD

CROSS-REFERENCE TO RELATED APPLICATION

This application claims priority to U.S. Provisional Patent Application No. 62/440,186 entitled "VIRTUAL PUNCH CARD," filed Dec. 29, 2016, and incorporated herein by reference in its entirety.

TECHNICAL FIELD

The present invention relates generally to the field of delivery of financial rewards to customers of a financial institution.

BACKGROUND

In modern financial arrangements, users can earn financial rewards by using payment accounts that they may have at a financial institution. These financial rewards are oftentimes presented to the user in the form of abstract quantities, such as points, or the like. Given this, users may be unaware of the extent of their earned financial rewards or their progress towards earning a particular financial reward.

SUMMARY

One embodiment of the invention relates to a system. The system includes a user database that stores user information concerning a plurality of users. The system also includes a network interface configured to communicate data over a network. The system also includes a processing circuit comprising a processor and memory, the memory structured to store instructions that are executable by the processor and cause the processing circuit to receive transaction information concerning a payment account belonging to a user. The instructions also cause the processing circuit to determine a reward category for the user based on the retrieved transaction information. The instructions also cause the processing circuit to generate virtual punch card parameters for the user based on the determined reward category. The instructions also cause the processing circuit to transmit, by the network interface over the network, virtual punch card content to a computing device associated with the user, the virtual punch card content including a first graphical interface configured to present the user with at least one of the generated virtual punch card parameters.

Another embodiment of the invention relates to a method. The method includes receiving, by a processor of a financial institution computing system associated with a financial institution, transaction information concerning a payment account associated with a user. The method also includes determining, by the processor, a reward category for the user based on the received transaction information. The method also includes generating, by the processor, virtual punch card parameters for the user based on the determined reward category. The method also includes transmitting, by the processor, virtual punch card content to a communication device associated with the user, the virtual punch card content including a first graphical interface configured to present the user with at least one of the generated virtual punch card parameters.

Another embodiment relates to a mobile device. The mobile device includes a network circuit structured to communicate data to and from a financial institution computing system associated with a financial institution. The mobile device also includes an input/output device structured to exchange data with a user. The mobile device also includes a processing circuit comprising a processor and memory, the memory structured to store instructions that are executable by the processor and cause the processing circuit to receive, by the network circuit, a first graphical interface from the financial institution computing system, the first graphical interface identifying various payment accounts held by the user at the financial institution and a virtual punch card parameter generated by the financial institution computing system, the first graphical interface enabling the user to select the virtual punch card parameter. The instructions also cause the processing circuit to receive a first input from the user via the input/output device, the first input indicating a user selection of the virtual punch card parameter. The instructions also cause the processing circuit to establish, responsive to the first input, a payment account associated with the virtual punch card parameter as a source account for a predefined mobile wallet transaction.

DETAILED DESCRIPTION

Referring to the figures generally, systems, methods, and apparatuses for implementing a virtual punch card rewards system are described herein. A computing system associated with a financial institution assesses the transaction history of a user having a payment account with the financial institution and categorizes the user's transactions. From this categorized transaction information, the financial institution computing system determines at least one reward category for the user. Having determined the reward category, the financial computing system then sets virtual punch card parameters and transmits a graphical depiction of a virtual punch card to a computing device associated with the user. The graphical depiction identifies at least one of the virtual punch card parameters. After transmittal of the virtual punch card, the financial institution computing system continues to monitor the user's transactions and, when it determines that certain virtual punch card parameters are met, rewards the user.

The embodiments and implementations of the systems and methods disclosed herein improve current financial rewards methods and computing systems for the provisioning and redemption of financial rewards by enabling financial institutions to incentivize certain financial activity of a user using the graphical depiction of a punch card. These systems, methods, and computer implementations enable financial institutions to tie punch card rewards to a specific financial institution account rather than, as in a traditional punch card arrangement, to a particular merchant. This enables the financial institution to facilitate user utilization of the financial account tied to the punch card over a wide variety of merchants in a certain category.

As used herein, the term "virtual punch card" refers to a subset of rewards that are issued by a financial institution to a user that can be redeemed through the financial institution. The subset referred to herein includes those rewards that are tied to a certain extent to the amount of user financial activity relating to a particular category, in that, once the amount of categorical activity reaches a threshold, the financial reward is triggered. The subset also refers to the those reward systems that present the user with graphics depicting the relationship between the current amount of activity of the user and the threshold for earning a reward. Any user activity capable of being monitored could be represented in the graphical depiction. The embodiments and systems disclosed herein encompass many graphical depictions as they relate to a user's reward-earning progress.

Figure 1:
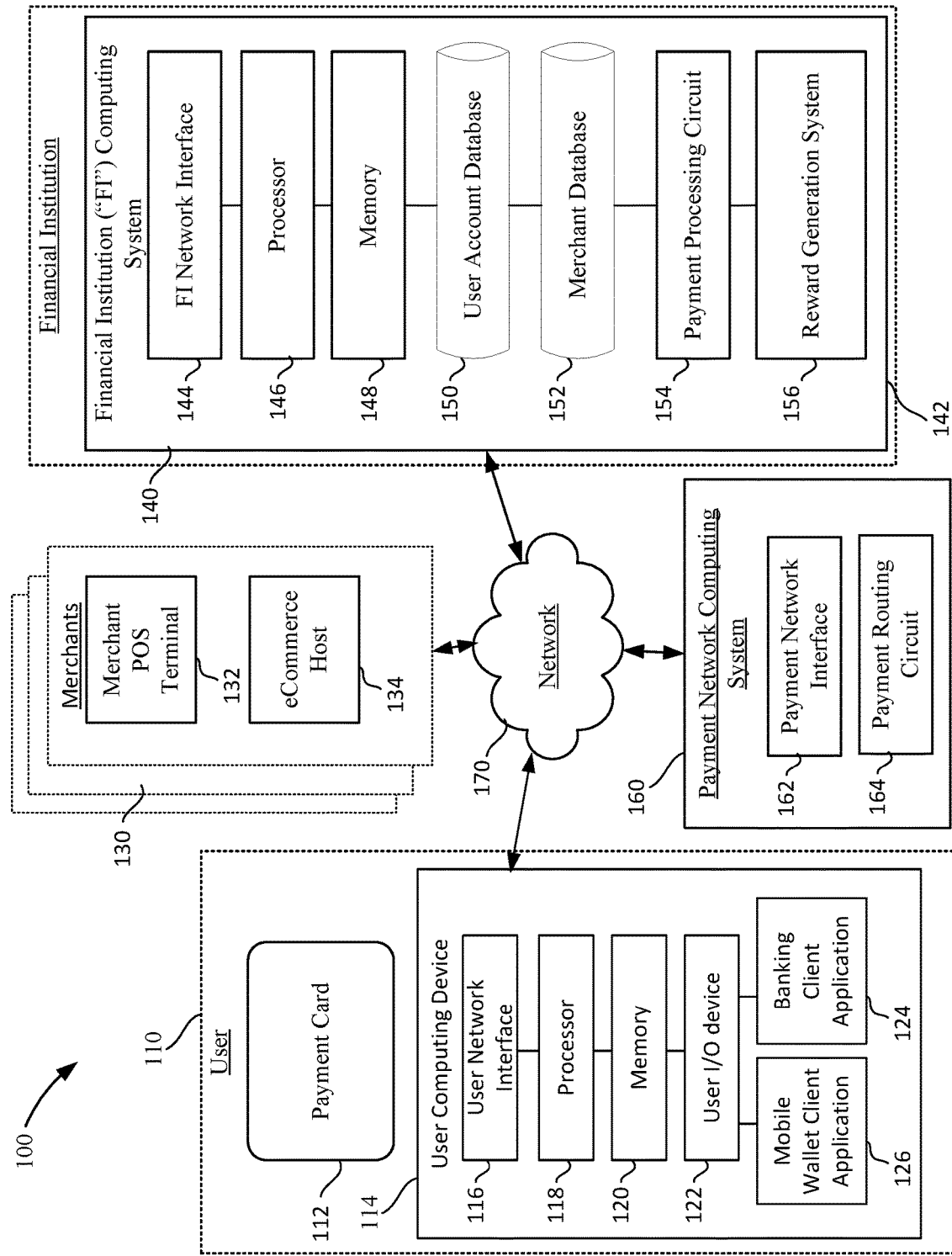
FIG. 1 shows a block diagram of a system for managing virtual punch card rewards. according to an example embodiment.

Referring now to FIG. 1, a block diagram of a system 100 for managing virtual punch card rewards is shown according to an example embodiment. As described herein, the system 100 facilitates the generation and relaying of virtual punch card rewards that are earned by a user 110 using a financial account associated with at least one payment card or account number 112. As shown, the system 100 includes at least one user computer device 114, associated with the user 110, at least one merchant 130, having an associated merchant POS terminal 132 and eCommerce host 134, at least one financial institution 140 having an associated financial institution computing system 142, at least one payment network computing system 160 having an associated payment routing circuit 164, and a network 170. The user computing device 114, the financial institution computing system 142, the POS terminal 132 or eCommerce host 134, and the payment network computing system 160 are all communicatively and operatively coupled to one another over the network 170.

The network 170 is any suitable type of network. For example, the network 170 is a wireless network interface (e.g., 802.11X, ZigBee, Bluetooth, Internet, etc.), a wired network interface (e.g., Ethernet), or any combination thereof. In some arrangements, the network 170 includes the Internet. The network 170 is structured to permit the exchange of data, values, instructions, messages, and the like between and among the various devices in the system 100, such as the user computing device 114 and financial institution computing system 142.

The financial institution computing system 142 is a computing system associated with a financial institution 140. The financial institution 140 may include commercial or private banks, credit unions, investment brokerages, or the like. The financial institution computing system 142 includes a processor 146 and a memory 148. The memory 148 may include non-transitory storage mediums housing one or more logics including instructions that are executable by the processor 146 such that the financial institution computing system 142 is configured to exchange data over the network 170, execute software applications, access websites, generate graphical user interfaces, and perform other similar operations. The financial institution computing system 142 also includes a network interface 144, enabling it to exchange information over the network 170, a user account database 150, a merchant database 152, a payment processing circuit 154 and a reward generation system 156.

The user account database 150 is a storage device structured to retrievably store user information relating to the various operations discussed herein. The user account database 150 may include non-transient data storage mediums (e.g., local disc or flash-based hard drives, local network servers, and the like) or remote data storage facilities (e.g., cloud servers). In various arrangements, the user account database 150 includes personal user information (e.g., names, addresses, phone numbers, and so on), identification information (e.g., driver's license numbers, standard biometric data, and so on), and user financial information (e.g., token information, account numbers, account balances, available credit, credit history, transaction histories, and so on).

The merchant database 152 is a storage device structured to retrievably store information pertaining to various merchants 130 that users 110 may transact with. The merchant database 152 may include non-transient data storage mediums (e.g., local disc or flash-based hard drives, local network servers, and the like) or remote data storage facilities (e.g., cloud servers). In various arrangements, the information stored in the merchant database 152 may include, for example, a set of merchant category codes ("MCC") that the financial institution 140 has associated with the various merchants 130. For example, when a particular merchant 130 first started accepting payments using payment accounts associated with the financial institution 140, the financial institution 140 may have assigned a particular MCC to that merchant. These MCC values may be transmitted to the financial institution computing system 142 in any transaction request that the merchant 130 (by, e.g., the merchant POS terminal 132) seeks to have authorized by the financial institution computing system 142. In some arrangements, other merchant data may be stored in the merchant database 152, such as a set of merchant names, location information for various merchants, and the like.

The financial institution computing system 142 further includes a payment processing circuit 154 and a reward generation system 156. Although FIG. 1 shows the payment processing circuit 154 and the reward generation system 156 as being separate, other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting. The payment processing circuit 154 is structured to process payment requests associated with payment accounts of users of the financial institution 140. The payment requests may be received directly from the user 110 (e.g., via the mobile wallet client 126), from the merchant 130 (e.g., via the merchant POS terminal 132, the eCommerce host 134, etc.), or from a payment network associated with a payment account (e.g., from the payment network computing system 160). The payment processing circuit 154 processes the payment requests by approving or declining payment requests. For approved payment requests, the payment processing circuit 154 is structured to charge users associated with the approved payment requests by debiting a rewards account, a credit account, or the like based on the type of the payment request and the parameters of the payment request.

The reward generation system 156 is configured to receive and categorize transaction information concerning the user 110, determine a reward category for the user 110, generate a virtual punch card consistent with the generated reward category, modify any generated virtual punch card, detect any triggering events for the purpose of modifying any generated punch cards, or the like. An example embodiment of the reward generation system 156 is set forth in FIG. 2.

In some examples, the reward generation system 156 is implemented within the processor of the financial institution computing system 142. For example, the reward generation system 156 is implemented as a software application stored within the memory of the financial institution computing system 142 and executed by the processor. Accordingly, such examples can be implemented with minimal additional hardware costs. However, other examples relate to apparatuses and methods implemented with dedicated hardware specifically configured for performing operations described herein with respect to the reward generation system 156. For example, the reward generation system 156 is implemented with a processing component separate from the processor 146.

Still referring to FIG. 1, the user 110 operates or is associated with a payment card 112 and the user computing device 114. In some configurations, the user 110 has at least one payment account at the financial institution 140 associated with the payment card 112. In some configurations, by using the payment card 112, the user 110 earns financial rewards from the financial institution 140. For example, the payment card 112 can provide information associated with a payment account to a merchant 130 at a POS terminal 132, by for example, swiping the payment card 112. The POS terminal 132, in turn, may transmit the received information to the financial institution computing system 142.

The user can also provide payment account information to an eCommerce host 134 associated with the merchant 130 during an online transaction. For example, the user 110 can access the online shopping website associated with the merchant 130 via the user computing device 112 and provide payment account information through a checkout feature of the online shopping website, and the eCommerce host 134 may then transmit the input information to the financial institution computing system 142 over the network 170.

In some arrangements, the payment account is associated with a payment network (e.g., Visa, MasterCard, American Express, Discover, etc.). Accordingly, when the payment account information is received by a merchant 130 during a transaction with the user 110, the payment account information and the transaction information (e.g., price, merchant information, etc.), may be transmitted to a payment network computing system 160 associated with the payment account. At the payment network computing system 160, the transaction information is received at a payment network interface 162, and a payment routing circuit 164 routes the transaction information and payment account information to the financial institution computing system 142 for further processing. In some arrangements, the payment routing circuit 164 is structured to detokenize a tokenized payment account number received from the merchant 130 (e.g., if the user 110 is paying for the transaction via the mobile wallet client application 126). In some arrangements, the tokenized payment account number is detokenized by the payment processing circuit 154 of the financial institution computing system 142.

The user computing device 114 is a computing device associated with the user 110. The user computing device 114 includes any type of computing device that may be used to conduct financial transactions (including redemption and earning of rewards) and/or receive information from the financial institution computing system 142. In some arrangements, the user 110 uses the user computing device 114 to communicate information with the financial institution computing system 142 or to make transactions with merchants 130. In this regard, the user computing device 114 may include any wearable or non-wearable device. Wearable devices refer to any type of device that an individual wears including, but not limited to, a watch (e.g., smart watch), glasses (e.g., eye glasses, sunglasses, smart glasses, etc.), bracelet (e.g., a smart bracelet), etc. User computing device 114 may also include any type of mobile device including, but not limited to, a phone (e.g., smart phone, etc.), tablet, personal digital assistant, and/or computing devices (e.g., desktop computer, laptop computer, personal digital assistant, etc.).

In the example shown, the user computing device 114 includes a processor 118 and a memory 120. The memory 120 may include non-transitory storage mediums housing one or more logics that include instructions executable by the processor 118 so as to configure the user computing device 114 to exchange data over the network 170, execute software applications, access websites, generate graphical user interfaces, and perform other similar operations.

The user computing device 114 also includes a user network interface 116, enabling the user computing device 114 to communicate over the network 170, a user I/O device 122, a banking client application 124, and a mobile wallet client application 126. The user I/O device 122 includes hardware and associated logics configured to enable the user computing device 114 to exchange information with the user 110, the merchant 130 (e.g. via the POS terminal 132 or the eCommerce host 134), and the financial institution computing system 142. An input aspect of the user I/O device 122 allows the user 110 to provide information to merchant 130 or financial institution computing system 142, and may include, for example, a mechanical keyboard, a touchscreen, a microphone, a camera, a 3D image scanner, a fingerprint scanner, any user input device engageable to the computing device 114 via a USB, serial cable, Ethernet cable, and so on. An output aspect of the user I/O device 122 allows an individual associated with the merchant 130, or the financial institution 140, to receive information from the user computing device 114, and may include, for example, a digital display, a speaker, illuminating icons, LEDs, and so on. In some arrangements, the user I/O device 122 includes communication circuitry for facilitating the exchange of information between the user I/O device 122 and the components of the user computing device (i.e., the mobile wallet client 126). Further, the user I/O device 122 may be configured to include assemblies that serve both input and output functions, allowing the financial institution computing system 142 and the merchant 130 to exchange information with the user computing device 114. Such assemblies include, for example, radio frequency transceivers (e.g., RF or NFC-based transceivers) and other short-range wireless transceivers (e.g., Bluetooth™, laser-based data transmitters, etc.).

The user computing device 114 further includes a banking client application 124 and a mobile wallet client application 126. One or more of these applications may be server-based applications executable on the user computing device 114. In this regard, the user 110 has to first download the application(s) prior to usages. In another arrangement, the banking client application 124 and the mobile wallet client application 126 are hard coded onto the memory of the user computer device. In another embodiment, these applications are web-based interface applications, where the user has to log onto or access the web-based interface before usage, and these applications are supported by a separate computing system comprising one or more servers, processors, network interface modules, or the like, that transmit the applications for use to the user computing device 114. The banking client application 124 and the mobile wallet client application 126 may further include an Application Programming Interface (API) that facilitate integration of other applications with the one or more of the banking client application 124 and the mobile wallet client application 126.

The banking client application 124 is structured to permit management of at least one account of the user 110 via the banking client application 124. Accordingly, the banking client application 124 is communicably coupled to the financial institution computing system 142 (e.g., the user account database 150) via the network 170. In this regard, the banking client application 124 provides displays indicative of account information such as, but not limited to, current account balances, pending transactions, profile information (e.g., contact information), rewards associated with the account, bill pay information and/or the like.

As mentioned herein, via the banking client application 124, the user also has the ability to manage any financial rewards they have earned through use of a payment account of the user 110 at the financial institution 140. As such, the banking client application 124 provides displays indicative of financial reward information received over the network 170 from the financial institution computing system 142 (e.g. responsive to the reward generation system 156), including, as will be described in greater detail below, virtual punch card reward information. In some arrangements, banking client application 124 obtains user input related to the virtual punch card and the virtual punch card reward information changes responsive to the received user input, as will be described in greater detail below. In some arrangements, in response to a mobile payment using a payment account associated with the payment card 112 via the mobile wallet client application 126, the banking client application 124 is configured to update the payment account. Accordingly, the banking client application 124 is communicably coupled to the mobile wallet client application 126.

The mobile wallet client application 126 is structured to facilitate and permit payments by interfacing with an account (e.g., a checking account) held by the user 110 at the financial institution 140. Accordingly, the mobile wallet client application 126 is communicably coupled via the network interface 116 over the network 170 to the financial institution computing system 142. The mobile wallet client application 126 may also include payment processing circuit (not shown) structured to facilitate payments by the user 110 via the mobile wallet client application 126. For example, the payment processing circuit enables a quickpay capability with a merchant 130. In this regard, the payment processing circuit includes or is communicably coupled with a communication device (e.g., a near-field communication chip) that facilitates the exchange of information between the mobile wallet client application 126 and the point-of-sale terminal 132.

In some arrangements, the mobile wallet client application 126 is structured to enable the user to select a default payment account from a plurality of payment accounts. In this regard, the mobile wallet client application 126 is structured to present displays on the user computing device 114 including information pertaining to various payment accounts held by the user to enable the user to select a payment account. In some arrangements, the displays presented by the mobile wallet client application 126 include a user virtual punch card as an option for a default payment account. In some arrangements, the mobile wallet client 126 may obtain a user input via the user I/O device 122 and, responsive to the received input, set the account associated with the virtual punch card as the default account with which the make mobile wallet payments for certain transactions, using methods described below.

In some arrangements, the mobile wallet client application 126 includes an API that facilitates the mobile wallet client application 126 receiving information communicated to the user computing device 114 by the merchant 130 (e.g., via the merchant POS terminal 132). For example, responsive to the user 110 engaging in a transaction at a merchant POS terminal 132, the merchant POS terminal 132 may be configured to transmit a receipt notification to the user computing device 114 identifying various characteristics of the transaction (e.g., a transaction amount, a product identity, and the like). The receipt notification may be in the form of an e-mail, text message, or the like, and viewable via a client application (e.g., the banking client application 124) implemented on the user computing device 114. The API included in the mobile wallet client application 126 may be configured to retrieve receipt notifications received from merchants 130 and determine whether the transactions detailed by the retrieved receipt notifications are in conformance with virtual punch card parameters, as will be described in greater detail below.

Figure 2:
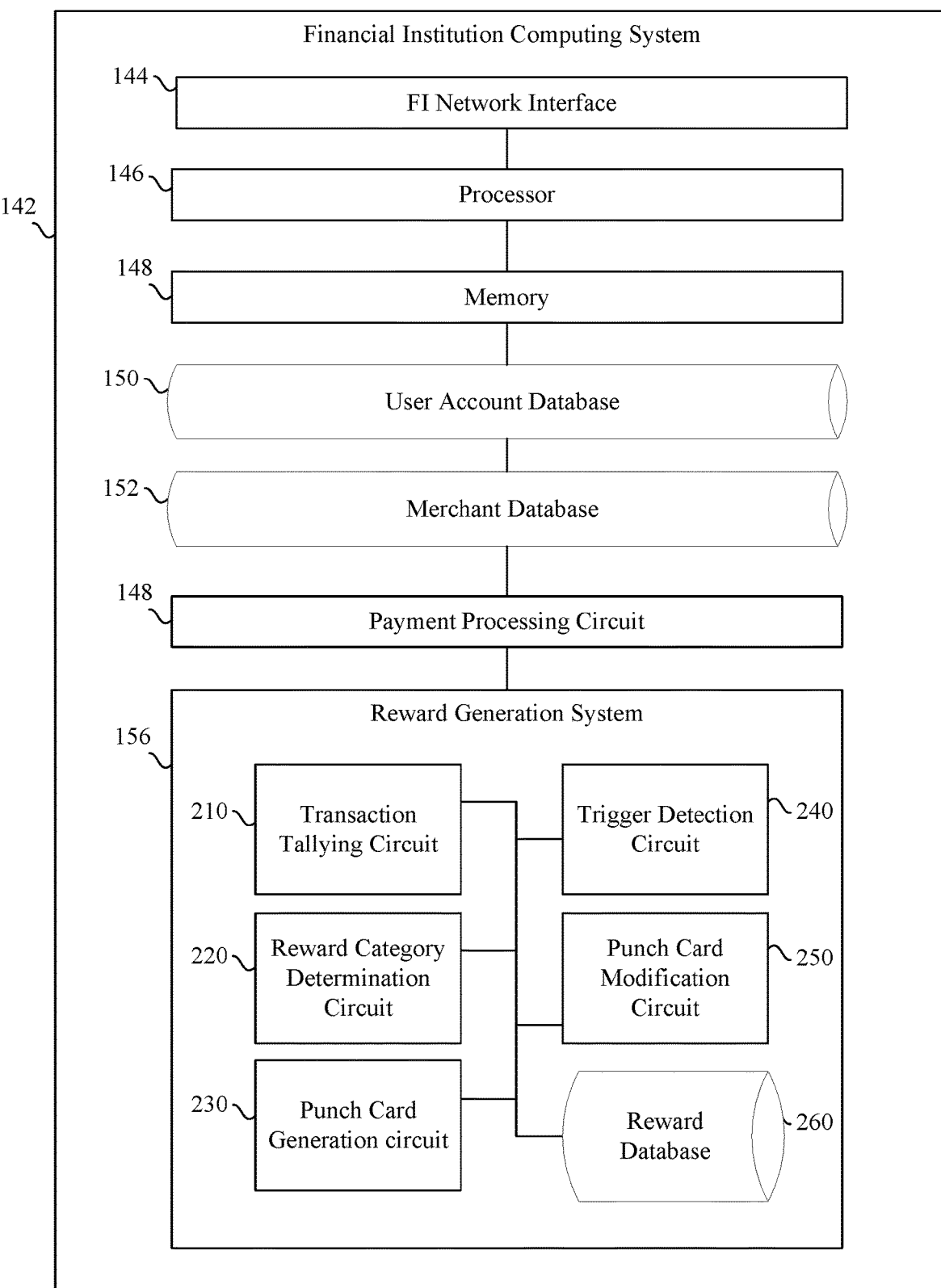
FIG. 2 shows a block diagram that describes components of the system shown in FIG. 1 in greater detail, according to an example embodiment.

Referring now to FIG. 2, a more detailed embodiment of the financial institution computing system 142 of the system 100 in FIG. 1 is shown. In particular, a more detailed view of the reward generation system 156 is shown. In some arrangements, the reward generation system 156 includes a transaction tallying circuit 210, a category determination circuit 220, a punch card generation circuit 230, a trigger detection circuit 240, a punch card modification circuit 250, and a reward database 260. Other embodiments may include less or more circuits without departing from the spirit and scope of the present disclosure. Further, some embodiments may combine the activities of one circuit with another circuit to form a single circuit. Therefore, those of ordinary skill in the art will appreciate that the present arrangement is not meant to be limiting. In some arrangements, the reward generation system 156 may be a stand-alone circuit having its own processor and memory.

The transaction tallying circuit 210 is configured to retrieve and assess user transaction information. In some arrangements, the transaction tallying circuit 210 retrieves user transaction information from the account database 150, which may store all the transactions in relation to at least one payment account of the user at the financial institution 140. Transaction information may also be communicated locally at the financial institution computing system 142 when the user 110 takes certain actions (e.g., opening up a new account, closing an account, redeeming a financial reward, etc.) in relation to at least one payment account held by the user 110. In some arrangements, the transaction tallying circuit is configured to retrieve transaction information from merchants 130 over the network 170 (e.g., from the merchant POS terminal 132 or the eCommerce host 134) as they occur for storage and assessment.

In operation, the tallying circuit 210 is configured to group transactions together based on a transaction category. The transaction categories are determined based on predetermined criteria. In some arrangements, the transaction tallying circuit 210 is configured to group transactions together by merchant category. For example, if the user engages in a transaction at a particular merchant 130 having a predesignated MCC, the transaction tallying circuit 210 is configured to identify the MCC associated with the merchant 130 and store the transaction information based on the identified MCC.

In certain arrangements, the transaction tallying circuit 210 is configured to group the transactions by different merchant categories. For an illustrative example, the financial institution 140 may use a merchant name to categorize merchants into merchant-name groups. For example, merchants whose names include the word "coffee" are grouped together in a merchant-name group. In other arrangements, merchants may be grouped together using other criteria, such as by location, or product pricing. To facilitate these arrangements, the financial institution computing system 142, may be configured to receive the requisite information from various POS terminals 132 associated with various merchants 130 over the network 170 via network interface 144.

In some arrangements, the transaction tallying circuit 210 may categorize transactions based on categories that have nothing to do with the merchant. Transactions may be categorized by, for example, time, location, mode of transaction (e.g. online or brick and mortar, mobile wallet, etc.), monetary amount, the time interval since the user 110 last used the payment account, etc. Furthermore, the transaction tallying circuit 210 may also be configured to categorize the transactions in multiple ways simultaneously. For example, the transaction tallying circuit 210 may store transactions by both merchant category as well as by time. To illustrate, if the user 110 purchased an item at a coffee shop at 8:00 A.M., then that transaction might be stored both in relation to a coffee shop MCC category and a "morning transaction" category.

The transaction tallying circuit 210 may be configured to store all user 110 payment account transactions over a predetermined period (e.g., over the course of a week, month, year, and so on). Alternatively, the transaction tallying circuit 210 may be configured to store all user 110 payment account transactions until user 110 takes an action with respect to a virtual punch card reward.

In some arrangements, the reward category determination circuit 220 determines a punch card category designed to incentivize a financial behavior desired of the user 110 by the financial institution 140. In various arrangements, the punch card category is largely determinative of the type of user activities that the user can engage in to earn punches on the virtual punch card. Using the transaction information stored by the transaction tallying circuit 210, the reward category determination circuit 220 determines a desired financial activity for the user 110 based on the timing, location, volume, monetary amount, and frequency of the transactions of the user 110. In one arrangement, the reward category determination circuit 220 bases the reward category off the user 110 not using the payment account for transactions of a certain category. For example, if the transaction tallying circuit 210 reveals that the user does not utilize the payment account for transactions at restaurants, the reward category determination circuit may be configured to generate a restaurant reward category. Thus, the reward category determination circuit 220 may base the reward category on finding relative transaction minimums (e.g., in number of transactions, or total amount spent) within the data stored by the transaction tallying circuit 210. This way, the financial institution 140 is encouraging a broader user usage of the payment account.

In some arrangements, the reward category determination circuit 220 may seek to increase the volume of transactions in a category that the user 110 already uses the payment account for. For example, the data stored by the transaction tallying circuit 210 may reveal that the user 110 uses the payment account for a high volume of retail transactions, but in assessing the total monetary amount of these retail transactions, the transaction tallying circuit 210 determines that the user likely still spends more at retail merchants. Given this, there is an opportunity to increase utilization of the payment account at retail merchants. Thus, the reward category determination circuit 220 may generate a retail merchant virtual punch card to absorb a higher portion of the spending capacity of the user 110 at merchants in that particular category.

In other arrangements, the reward category determination circuit 220 may base the reward category off of financial institution activity of the user 110. For example, if the user 110 has failed to take certain actions with respect to the payment account (e.g. failed to open up a savings account, failed to download a mobile wallet application, etc.), then it may be desirable for the financial institution 140 to incentivize the user 110 to do these things using a virtual punch card rewards system. In some arrangements, in such circumstances, the reward category determination circuit 220 may issue the reward in a high user volume transaction area. For example, the information stored by the transaction tallying circuit 210 may reveal a user preference for using the payment account for transactions at gas stations. To facilitate further user involvement with the financial institution, the reward category determination circuit 220 may choose gas as a reward category, but the virtual punch card will be configured, using methods described in greater detail below, such that it will reward the user for taking certain actions, like setting up a savings account, with the financial institution 140.

In various arrangements, the reward category determination circuit 220 may be configured to select a punch card category using any of the above mentioned methods. Which particular category of punch card that the reward category determination circuit 220 generates may depend on the totality of information stored in the user account database 150. In one arrangement, if the user 110 uses the payment account for a high volume of transactions in a particular category and is fully involved (e.g., takes advantage of a high volume of products of the financial institution 140) with the financial institution 140, then the category determination circuit may generate a reward category by searching for a low-volume transaction category. In another circumstance, if the user 110 is a low volume user of the payment account across all transaction categories, then the reward category determination circuit may poll transaction data from a plurality of users and pick a popular reward category amongst the plurality of users. In other arrangements, the particular pathway that the reward category determination circuit 220 takes to determine the reward category will depend on preferences pre-configured into the reward category determination circuit 220 by personnel at the financial institution 140.

The punch card generation circuit 230 is configured to, based on the determined reward category, determine virtual punch card parameters and generate a graphical depiction of the virtual punch card for delivery to the user 110. Virtual punch card parameters may include for example, the number of punches (e.g., the number of transactions in the reward category necessary for the user to earn a reward), the time limit for earning the requisite number of punches, the activities that will earn the user a punch, and the actual award received when the user earns the requisite number of punches. In one arrangement, the number of punches and the time limit may be determined by an expected frequency of transactions. To illustrate, if the reward category is a low cost, frequent category (e.g., food), then the number of punches may be a relatively high number, while the time limit may be relatively short.

In various arrangements, the user activity that will generate a punch on the punch card depends on the reward categories determined by the category determination circuit 220. In some arrangements, if the reward category involves a category in which the user 110 is already engaging in a high volume of transactions using the payment account, then the punch card generation circuit 230 may be configured to allow certain user actions with respect to the financial institution 140 (e.g., opening up a savings account, visiting a financial planner), to earn the user at least one punch. If, in contrast, the reward category is one where the user is engaging in a low volume of transactions, the punch card generation circuit 230 may limit the user activities that will generate a punch.

In some arrangements, the user activities that will generate a punch will be the same irrespective of the punch card category. In other words, the punch card generation circuit 230 will set the same user activity parameter (e.g., the generated reward category) for earning punches regardless of the reward category generated. In other arrangements, the user activities that will generate a punch will depend on the transaction information stored by the transaction tallying circuit 210.

With regard to determining the particular reward that the user 110 earns by filling a punch card, the punch card generation circuit 230 uses procedures similar to determining the reward category discussed above in relation to the reward category generation circuit 220. In some arrangements, the financial reward is tied to the reward category generated by the reward category determination circuit 220. For example, if the reward category determination circuit 220 determines to reward the user for engaging in transactions with merchants belonging to a particular category, then the financial reward received will be an amount towards another transaction at a merchant of that category. To illustrate, if the user earns punches through engaging in transactions at restaurants, then the financial reward may be a free meal at a restaurant.

In some arrangements, the generated virtual punch card parameters are configured such that the user 110 may earn punches by engaging in transactions within a predetermined value range (e.g., $5-$50) at merchants in a particular merchant category. Additionally, the virtual punch card parameters are also configured such that the reward earned by filling a punch card is a predetermined discount percentage (e.g., 25%, 50%, 100%) for an additional transaction within the predetermined value range. In one example situation, a particular user receives virtual punch card parameters that enable the user to earn punches by engaging in transactions between $2 and $15 at coffee shops and to receive a financial reward after earning ten punches. Responsive to the user earning ten punches, the virtual punch card parameters are configured such that the financial institution 140, using methods described below, provides the user with a 100% discount on the eleventh $2 to $15 transaction at a coffee shop.

In some arrangements, the generated virtual punch card parameters are configured such that the user 110 may earn punches by purchasing a particular type of product as defined by various product parameters. Product parameters may identify various product classifications (e.g., food, home accessories, furniture, electronics, appliances, and the like). Product parameters may also include a predetermined list of products in various product classifications. Product parameters may also define products that must be purchased to earn punches using various product aspects (e.g., product characteristics such as age, manufacturer, and the like). Additionally, the virtual punch card parameters are also configured such that the reward earned by filling a punch card is a predetermined discount percentage (e.g., 25%, 50%, 100%) for the purchase of an additional product that also conforms with the specified product parameters. To provide an illustrative example, a particular user may receive virtual punch card parameters that are configured such that the user earns punches by purchasing coffee at various coffee shops using the mobile wallet client application 126 and earns a reward by earning eight punches. The reward earned by the user may be a 100% discount on ninth coffee purchased by the user. In such arrangements, the mobile wallet client application 126 may be configured to determine if products being purchased by the user conform with the specified product parameters. For example, in such arrangements, the merchant POS terminal 132 may transmit a transaction receipt to the user computing device 114. As discussed above, the mobile wallet client application 126 may include an API that facilitates the mobile wallet client application 126 receiving information contained in the transaction receipt. Responsive to receiving the information contained in the transaction receipt, the mobile wallet client application may be configured to identify the product purchased by the user, and notify the financial institution computing system 140 of the product that was purchased by the user so that the financial institution computing system 140 (e.g., through the trigger detection circuit 240 as will be discussed below) can determine if the user has earned a punch.

In some arrangements, the financial reward displayed on the punch card may be unrelated to the activities that earn the user 110 punches on the punch card. For example, the punch card generation circuit 230 may determine to reward the user for engaging in transactions at merchants in a particular category in which the user does not use the payment account by paying for a user transaction in another category. Put differently, the user 110 earns punches by engaging in transactions of a first category, but gets a financial reward towards a transaction in a second category. The rewards identified herein may include, for example, an account balance offset, a gift card to a certain merchant, reward points, better interest rates, or the like.

In some arrangements, the punch card generating circuit 230 is configured to generate a punch card that does not display one or more of the punch card parameters. For example, the number of punches that the user 110 needs to obtain a financial reward may not be displayed to the user. That way, an element of surprise is added to the virtual punch card, and the user 110 may be further encouraged to engage in the identified transactions to earn punches, and potentially rewards. In another example, the financial reward to be earned through completing the punch card is not displayed to the user.

After generating punch card parameters for the user 110, the punch card generation circuit 230 may be configured to also generate content that includes some or all of the generated virtual punch card parameters and transmit that content via the network interface 144 to the user computing device 114. The transmitted content may be configured to present the user with a graphical interface on the user computing device 114 (e.g., by the banking client application 124) that displays the virtual punch card to the user 110. In some arrangements, the transmitted content is viewable on-demand by the user on the user computing device 114. For example, the banking client application 124 may include a "rewards" section that allows the user to view a graphical depiction of the virtual punch card that is updated to reflect the user 110's most recent transactions by the methods described below. Thus, the user is able to view progress towards earned financial rewards on-demand, and is incentivized to engage in activities to earn punches.

The trigger detection circuit 240 is configured to determine whether the user 110 has engaged in any transactions that are in conformance with the punch card parameters generated by the punch card generation circuit 230. Accordingly, the trigger detection circuit 240 is configured to monitor user transaction data received from merchants 130, the user computing device 114, or internally (i.e., from the account database 150) and assess whether any user transactions require an updating of the virtual punch card. This may include, for example, identifying a merchant category (e.g., a MCC) associated with any transaction requests received from merchants 130, and comparing that merchant category to the reward category set by the reward category determination circuit 220. In some arrangements, this may include assessing transaction timing and location information, and comparing that with the virtual punch card parameters set by the punch card generation circuit 230. If the received user transaction information is in conformance with the punch card parameters, the trigger detection circuit 240 may be configured to communicate a notification to the punch card modification circuit 250, which may update the virtual punch cards using methods that will be described in greater detail below.

In some arrangements, the trigger detection circuit 240 may be configured to detect certain patterns in user transaction data and may initiate a modification of the virtual punch card for the user 110. For example, if a virtual punch card has been created and transmitted to a user computing device 114, the trigger detection circuit 240 may be configured to monitor how often the user engages in punch-earning transactions. If, for example, the user 110 has failed to engage in any punch-earning transactions within a predetermined period, the trigger detection circuit 240 may communication of this to the punch card modification circuit 250, which may modify various parameters of the punch card using methods to be described in greater detail below.

In some arrangements, the trigger detection circuit 240 may also be configured to determine when the user 110 has completed any virtual punch cards. If, for example, the user 110 engages in a transaction in conformance with the punch card parameters, and that transaction is the last one that the user needed to engage in to earn a financial reward, the trigger detection circuit 240 may be configured to communicate a completion notification to the punch card modification circuit 250, which may provide a financial reward to the user using methods that will be described in greater detail below.

The punch card modification circuit 250 is configured to modify at least one aspect of the generated virtual punch card. Modification may, for example, occur responsive to the user engaging in a transaction in accordance with the virtual punch card parameters, as determined by the trigger detection circuit 240. In some arrangements, the punch card modification circuit 250 may be configured to modify the punch card responsive to input received from the user 110 (e.g., from the user I/O device 122 responsive to actions taken on the banking client application 124 or the mobile wallet client application 126). For example, the user 110 may indicate a reward preference for a category other than the one generated by the reward category generation circuit 220, and the punch card modification circuit 250 may modify the punch card to correspond with the user indicated preference.

In various arrangements, modification of the virtual punch card may include varying the virtual punch card parameters set by the punch card generation circuit 230. For example, responsive to the user 110 engaging in a transaction in conformance with existing virtual punch card parameters, the punch card modification circuit 250 may be configured to update the number of transactions that the user 110 needs to engage in to earn a financial reward, and transmit modified content incorporating this update over the network 170 by the network interface 144 to the user computing device 114. This way, the user 110 may view a graphical depiction of an updated punch card. In some arrangements, the punch card modification circuit 250 may modify certain punch card parameters responsive to receiving an indication (e.g., from the trigger detection circuit 240) that the user 110 has failed to engage in transactions of the reward category. The punch card modification circuit 250 may, for example, change the financial reward viewable by the user on the virtual punch card.

In some arrangements, the punch card modification circuit 250 is configured to present the user 110 with a reward payment interface responsive to receiving an indication that the user 110 has completed a virtual punch card. The punch card modification circuit may generate a reward payment interface and transmit that interface over the network 170 by the network interface 144 to the user computing device 114 for viewing by the user 110. The reward payment interface may notify the user 110 of the earned financial reward, and may include, for example, a reward amount as well as a reward payment method. Examples of a reward payment interface are discussed below in relation to FIG. 6b and FIG. 7 below.

The reward database 260 is configured to store information pertaining to virtual punch cards. As such, the reward database 260 stores information related to the reward associated with the user 110. The information includes, but is not limited to, an amount of the reward, the virtual punch card parameters, the reward category, user progress to earning the reward, or user reward utilization data. In some arrangements, the reward database 260 also stores graphical content used, for example, by the punch card generation circuit 230 and the punch card modification circuit 250 to generate graphical depictions of virtual punch cards to be presented to various users.

Figure 3:
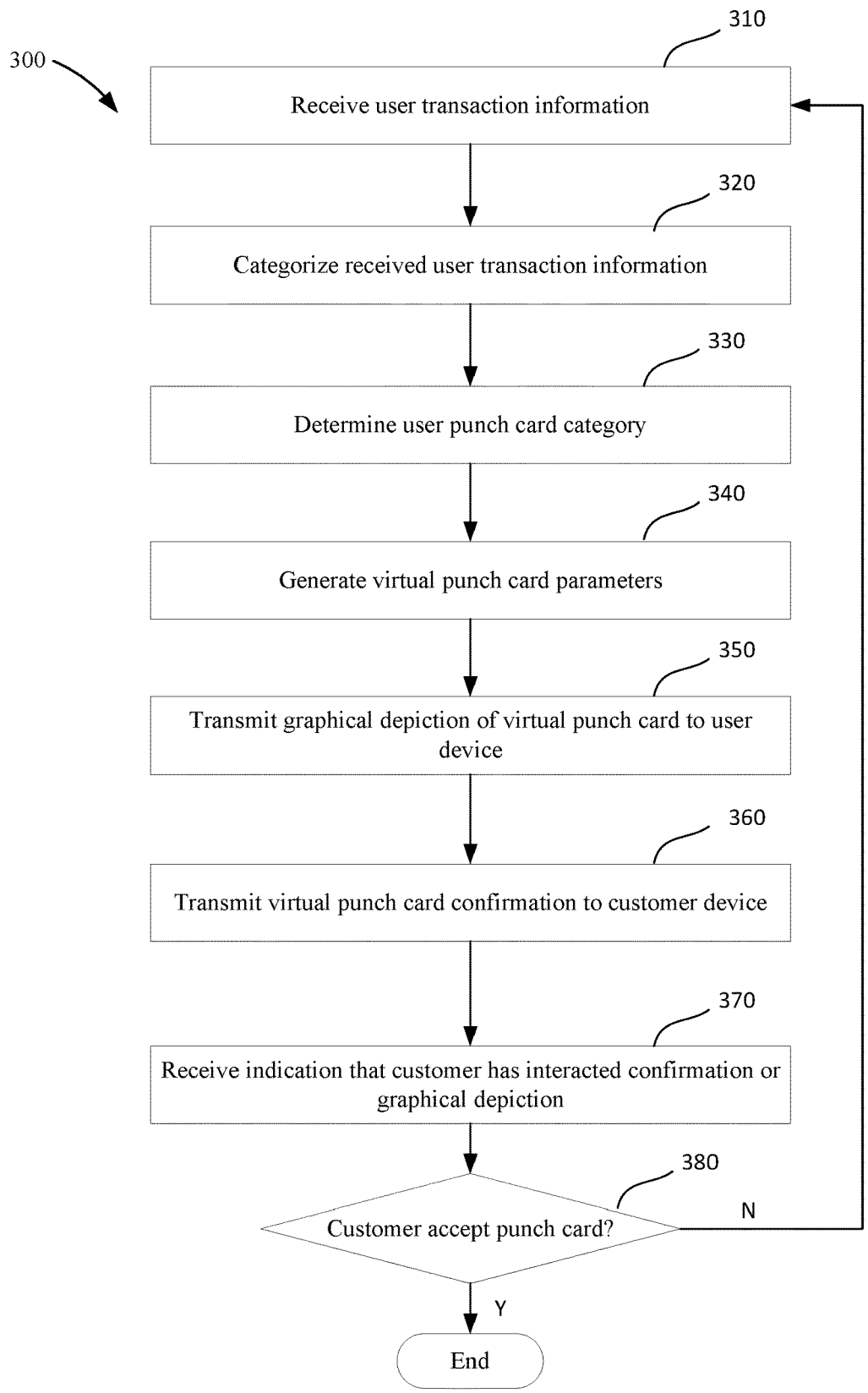
FIG. 3 shows a flow diagram of a method for generating a virtual punch card reward for a user, according to an example embodiment.

Referring now to FIG. 3, a method 300 for delivering a virtual punch card reward to a user is shown according to an example embodiment. The method 300 is performed by the financial institution computing system 142 (e.g., through the reward generation system 156 and payment processing circuit 154). Through the method 300, the financial institution computing system 142 generates a virtual punch card particularly configured for a user (e.g., the user 110).

Transaction information is received at 310. In some arrangements, the transaction information may be communicated locally (e.g., retrieved from the user account database 150) to the reward generation system 156. In some arrangements, the reward generation system 156 (e.g., through the transaction tallying circuit 210) is configured to receive user transaction information over the network 170 from merchants 130 as the user 110 engages with transactions with those merchants 130. The reward generation system 156 may be configured to accumulate user information received over the network 170 over a predetermined period.

User transaction information categorized at 320. In some arrangements, the reward generation system 156 (e.g., through the transaction tallying circuit 210), is configured to assess the information received at 310 and tabulate the transactions by category, as discussed above. As will be appreciated by those of ordinary skill in the art, the extent to which the transaction tallying circuit 210 can categorize the received user transaction information will depend on the extent of the information received. Accordingly, in some arrangements, if the reward generation system 156 determines that the received transaction information is lacking sufficient detail to effectively categorize, an information request may then be relayed to either the merchant 130 or the user computing device 114 to request any necessary additional information regarding any particular transaction.

A punch card category is determined for the user at 330. In some arrangements, the reward generation system 156 (e.g., via the reward category determination circuit 220) determines the types of transactions that the user 110 needs to engage in to earn a punch on the virtual punch card. In some arrangements, the punch card category is determined by identifying a preferred activity for the user 110. After the received transaction information is categorized, the reward generation system 156 determines at least one activity to incentivize the user to engage in using the virtual punch card. To do this, the reward generation system 156 (by, e.g., the reward category determination circuit 220) may perform various operations on the categorized transaction data, such as determine the number of transactions in each category, a total amount spent by the user in each category, and the like. These operations may also include comparing user transaction data with other information (e.g., averages of other users, or other normalization data) stored in financial institution computing system 142. Based on this information, a preferred financial activity of the user is determined, using, for example, the methods discussed above in relation to FIG. 2.

In some arrangements, rather than generating a reward category for the user based on the user's historical transaction data as discussed above, the reward generation system 156 reactively generates a reward category based on a recent user transaction. In such arrangements, steps 310-330 take a different form. The reward generation system 156 may receive information regarding a recent user transaction, determine if the recent user transaction is associated with an activity for financial institution 140 to incentivize, and generate a reward category associated with that activity. To provide an illustrative example, the user 110 may engage in a transaction at a coffee shop using the payment card 112. Once the financial institution computing system 142 receives information of the transaction (e.g., at the payment processing circuit 154), the reward generation system 156 identifies the transaction as an activity to incentivize and generates a reward category for the user such that the user can earn punches by engaging in more transactions at various coffee shops.

Virtual punch card parameters are determined at 340. Virtual punch card parameters may include, for example, the number of punches (i.e., the number of transactions in the reward category necessary for the user to earn a reward), the time limit for earning the requisite number of punches, the activities that will earn the user a punch, and the actual award received when the user earns the requisite number of punches. These parameters may be generated by the reward generation system 156 (e.g., via the punch card generation circuit 230) using any of the methods discussed above in relation to FIG. 2.

A graphical depiction of a virtual punch is transmitted to the user 110 at 350. The graphical depiction is generated, for example, by the punch card generating circuit 230 in the financial institution computing system 142. In some arrangements, this depiction is transmitted over the network 170 for viewing by the user 110 (e.g., by the user computing device 114 via the banking client application 124). In some arrangements, the punch card generating circuit 230 generates a link to the graphical depiction and transmits the link to the user computing device 114 such that, when the user 110 selects the link, the graphical depiction is displayed.

In some arrangements, the graphical depiction notifies the user 110 of at least one aspect of the virtual punch card reward. In some embodiments, the graphical depiction contains a representation of at least one of the reward parameters generated at 340 discussed above. In some arrangements, the graphical depiction contains less than all of the set reward parameters. Any one of the parameters, such as the number of punches, the reward, the punch-generating activities, and the like, may not be shown to generate an element of surprise for the user 110. For example, the total number of punches needed to earn a financial reward is not shown. In another arrangement, none of the reward parameters are displayed in the graphical depiction; the user 110 is merely displayed a notification of the virtual punch card reward.

In some arrangements, after the user 110 is notified of the virtual punch card reward, the financial institution computing system 142 is configured to transit a punch card confirmation to the user at 360. This confirmation may give the user 110 the ability to indicate whether they wish to participate in the virtual punch card reward program. In other arrangements, this confirmation may be included in the graphical depiction of the virtual punch card transmitted to the user at 350.

A indication of an interaction by the user 110 with either the graphical depiction transmitted at 350 or the confirmation transmitted at 360 is received at 370. In some arrangements, for example, the user 110 may have indicated on the user computing device 114 that they wish to accept the virtual punch card by interacting with the transmitted confirmation via the user I/O device 122. Any interaction is transmitted by the user network interface 116 over the network 170, and received by the financial institution computing system 142. In some arrangements, any interactions that the user 110 has with the graphical depiction of the virtual punch card (e.g., indicating a preference as to the type of virtual punch card) are similarly transmitted to the financial institution computing system 142, and relayed to the reward generation system 156 via the network interface 144.

From the received indications, user acceptance of the virtual punch card is determined at 370. If the user interaction received at 370 signifies an acceptance of the reward, then a reward generation system 156 may be transmitted to the user computing device 114, so as to enable the depicted virtual punch card to be implemented and updated on the user computing device 114. Alternatively, the accepted virtual punch card depiction and parameters are stored in the user account database 150. If the user 110 does not accept the punch card, then reward generation system 156 may be configured to repeat steps 310-360 (e.g., receive additional user transaction information, and generate a different reward category for the user 110 based on the updated transaction information) to generate another set of punch card parameters and an alternative punch card to be relayed to the user at a later time. In other arrangements, if the user 110 does not accept the presented virtual punch card, then the method 300 ends.

In various arrangements, virtual punch cards transmitted to the user computing device 114 may also include instructions that update either the banking client application 124 or the mobile wallet client application 126 of the user computing device 114. Any instructions transmitted to the user computing device 114 may include program logic (e.g., an API) that instruct the user computing device 114 (by, e.g., the banking client application 124) to communicate certain information concerning the user at particular times to the financial institution computing system 142. For example, in some arrangements, the instructions configure the user computing device 114 to transmit user location information (e.g., obtained by a GPS device implemented on the user computing device 114) to the financial institution computing system 142 each time the user 110 engages in a transaction using the payment account associated with the virtual punch card, or each time the user 110 engages in a transaction that conforms with the virtual punch card parameters set for the user. This way, the financial institution computing system 142 may be aware of the location of the user 110 when they engage in transactions meeting the punch card parameters. Any received information may be stored in relation to the virtual punch card parameters of the user 110 in, for example, the rewards database 260 or the user account database 150.

Figure 4:
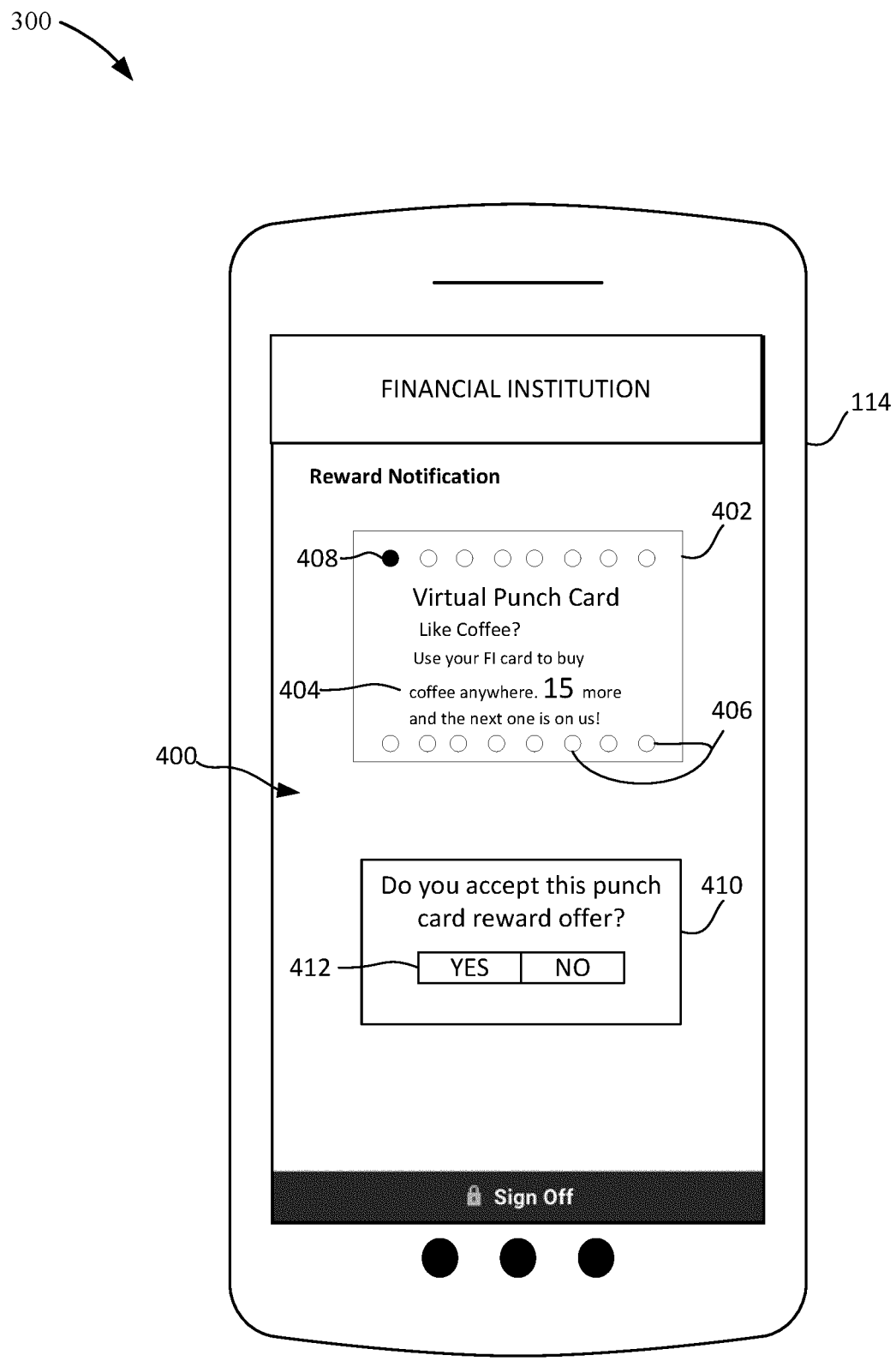
FIG. 4 shows an example interface presented to the user during the method shown in FIG. 3, according to an example embodiment.

FIG. 4 displays an example interface 400 presented to the user 110 during the method 300. In some arrangements, after the financial institution computing system 142 generates a set of virtual punch card reward parameters for the user 110 (e.g., the at 340 in the method 300 discussed above), the financial institution computing system 142 may be configured to generate a reward notification and a graphical interface 400 for viewing on the user computing device 110. The user 110, upon receiving the notification of the virtual punch card reward, may then log into the banking client application 124 and view the graphical depiction 402 of the reward. As shown the graphical depiction 402 includes a description 404 of the transactions through which the user 110 can earn punches and a description of the financial reward. The graphical depiction 402 also displays punches 406 that must be completed to earn the identified financial reward, as well as any earned punches 408 that the user 110 has earned through any previous transactions. The interface 402 also includes a punch card reward confirmation window 410, prompting the user 110 to indicate whether they wish to accept the reward. The confirmation window 410 also includes acceptance button 412, giving the user 110 the ability to indicate whether they wish to accept or decline the virtual punch card reward.

Figure 5:
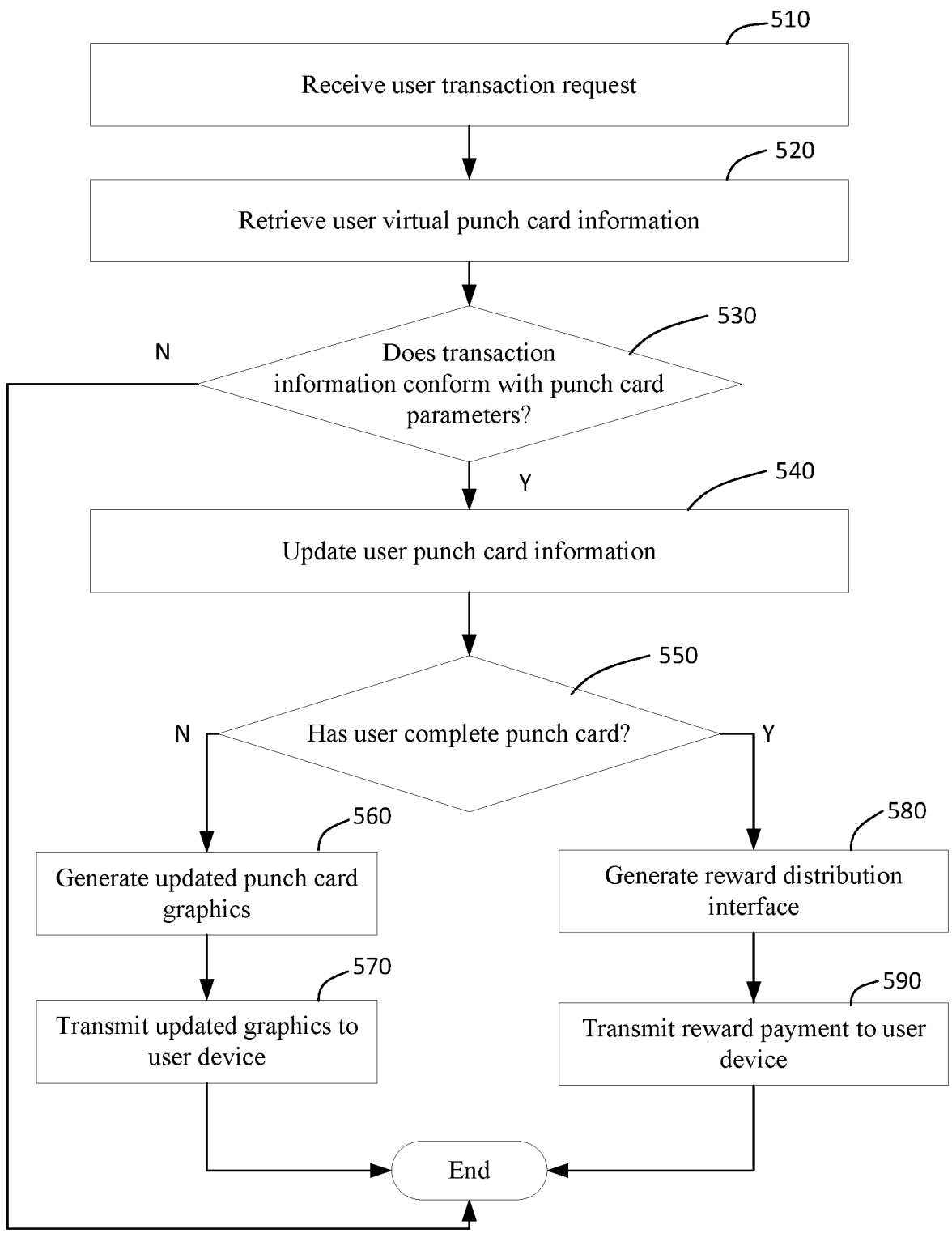
FIG. 5 shows a flow diagram of a method for updating a virtual punch card responsive to received user transaction information, according to an example embodiment.

Referring now to FIG. 5, a method 500 of updating a virtual punch card responsive to received user transaction information is shown according to an example embodiment. Method 500 may be initiated continuously after a virtual punch card is generated for the user 110 and accepted during the method 300 discussed above in relation to FIG. 3. In various arrangements, the method 500 is performed by the financial institution computing system 142 (e.g., through the reward generation system 156 and payment processing circuit 154).

A user transaction request is received at 510. In some arrangements, the user 110 engages in a transaction using a payment account associated with the financial institution 140. The transaction request is received over the network 170 from either the merchant 130 (e.g., through the merchant POS terminal 132) or, in the case when the payment account is associated with a card network, from the payment network computing system 160 (though, e.g., the payment routing circuit 164). The transaction request can include both user identifying information and transaction information. In some arrangements, the transaction request is communicated by the network interface 144 to the payment processing circuit 154, which is configured to authorize the transaction request by comparing the transaction information to information stored in the account database 150.

In some arrangements, rather than receiving a transaction request from a merchant 130, the reward generation system 156 receives information from the user computing device 114. For example, in various arrangements, the interface presented to the user (e.g., via the banking client application 124) that includes the virtual punch card includes a transaction-reporting feature. For example, the user may engage in a transaction that they believe is compatible with the generated virtual punch card parameters, but, for whatever reason (e.g., mis-categorized merchant), the reward generation system 156 may have failed to determine (e.g., using methodologies discussed below with respect to the step 520) that the transaction is compatible with the punch card parameters. In such a situation, the virtual punch card would not be updated. In this regard, the transaction-reporting feature enables the user to report a missed transaction. For example, responsive to user selection of the transaction reporting option, the user may be brought to an interface that presents the user with a transaction history associated with the payment card 112. On this transaction history, the user may be able to identify the transaction which they believe warrants a punch. Upon the user identifying the missed transaction, information concerning the identified transaction may be transmitted to the reward generation system 156 for re-assessment (e.g., by the steps described below, or by financial institution personnel). Various updates may be made to the user's virtual punch card parameters to correct for any missed transactions. For example, responsive to it being determined that the user deserves a punch for the reported transaction (e.g., by financial institution personnel), punch card parameters may be updated such that future similar transactions produce user punches.

User virtual punch card information is retrieved at 520. In some arrangements, the reward generation system 156 (e.g., through the trigger detection circuit 240) is configured to identify any ongoing virtual punch cards of the user, and retrieve associated punch card parameters from the reward database 260 based on the transaction information received at 510. If there are no virtual punch cards are associated with the user 110, the reward generation system 156 may be configured to store the received transaction information in the transaction tallying circuit 210 for use in configuring a virtual punch card to be delivered to the user in the method 300, for example.

The received transaction information is checked for conformance with virtual punch card parameters at 530. The reward generation system 156 (e.g., through the trigger detection circuit 240) is configured to cross reference the transaction information received at 510 with the parameters associated with a virtual punch card of the user 110. In some arrangements, this may include identifying a merchant associated with the received transaction information and determining whether the identified merchant is within the merchant category set forth by the virtual punch card parameters. In some arrangement, the reward generation system 156 also determines whether a transaction time, location, mode, or amount is consistent with the virtual punch card parameters. If the transaction request is inconsistent with the virtual punch card parameters, then the virtual punch card will not be updated and so the method 500 ends. If however, the received transaction request is consistent with the virtual punch card parameters, then the method 500 continues.

The virtual punch card information is updated at 540. In some arrangements, the reward generation system 156 (through, e.g., the punch card modification circuit 250) may update various punch card parameters associated with a virtual punch card of the user 110. For example, if the user engages in a transaction compatible with virtual punch card parameters, the user may earn a punch, and so the number of filled punches on the punch card will be increased by one, and the amount of punches that the user 110 needs to earn the reward will decrease by one. In some arrangements, a compatible transaction received may also update the time-limit for the user earning the financial rewards or update the financial reward itself. For example, if the user engages in a high volume of transactions shortly after being notified of the virtual punch card, then the punch card modification circuit 250 may be configured to increase the financial reward so as to maintain user enthusiasm about the virtual punch card.

It is determined if the user 110 has completed the virtual punch card at 550. After the punch card information is updated, the reward generation system 156 (through, e.g., the punch card modification circuit 250) determines whether the user has completed (i.e. earned all available punches) the punch card. If the user has not completed the punch card, then the punch card modification circuit 250 is configured to update the graphical depiction of the punch card that was previously displayed to the user based on the updated punch card information, and transmit a notification along with this updated depiction to the user at steps 560-570. In some arrangements, this is done using the same methodology discussed in relation to steps 350-360 of the method 300 discussed in relation to FIG. 3 above.

In some arrangements, additional punch card parameters may be displayed to the user 110 on the updated graphical depiction of the virtual punch card. In some embodiments, the initial virtual punch card depiction (e.g., generated during the method 300) displayed to the user 110 does not display all of the virtual punch card parameters to the user 110. All of the activities that earn the user 110 a punch on the virtual punch card, for example, may not be displayed in the initial punch card. In the method 500, however, the punch card modifying circuit 250 may update the graphical depiction to display virtual punch card parameters that were previously hidden from the user. Accordingly, the user 110, upon engaging in a compatible transaction, the user 110 may be presented with an additional way of earning punches.

A reward distribution interface is generated at 580. In some arrangements, the reward generation system 156 (e.g., through the punch card modification circuit 250) is configured to transmit content depicting a financial reward to the user computing device 114 over the network 170 via the network interface 144. The form that this content takes may depend on the form of the financial reward associated with the completed virtual punch card. In some arrangements, where the financial reward is to offer the user 110 a free purchase at a merchant within a specified category, the reward distribution interface includes a reward notification, notifying the user 110 that they have earned a reward, as well as a form of payment. In certain embodiments this form of payment may include a QR code authorizing payment from a reward account at the financial institution 140 for a predetermined transaction (e.g., at a particular merchant for a particular product). In some arrangements, the reward payment may include a notification of reimbursement (e.g., in the form of an account balance offset) for the previous transactions. In some arrangements, the user 110 is given multiple reward distribution methods and may choose among those multiple reward distribution methods.

A reward payment is distributed to the user 110 at 590. Similar to the reward distribution interface discussed above, the reward payment may take any of a variety of forms, depending on the financial reward associated with the virtual punch card. In some arrangements, responsive to a received user indication that they wish to use the earned financial reward, the punch card modification circuit 250 is configured to transmit a form of payment to the user computing device 114. This form of payment may include, for example, a QR code for a pre-authorized amount and type of transaction, or the like. In other embodiments, the actual distribution of the reward takes the form of updating a user reward account balance in the user account database 150 to reflect the distributed reward.

Figure 6B:
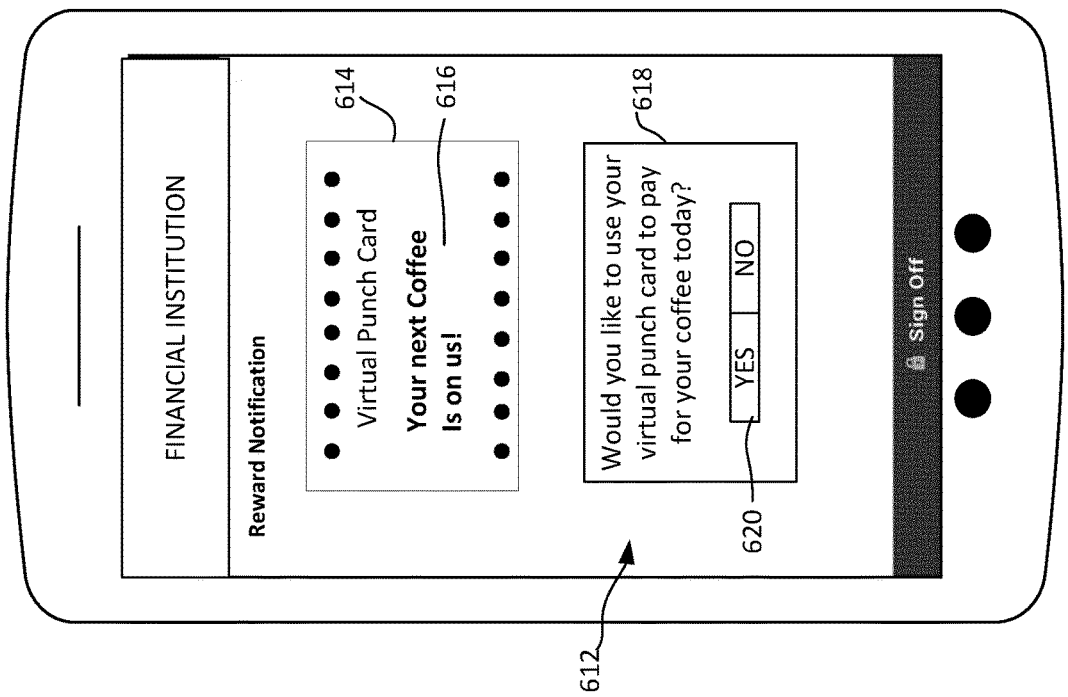
FIGS. 6a-6c show example interfaces presented to the user during the method shown in FIG. 5, according to an example embodiment.
Figure 6A:
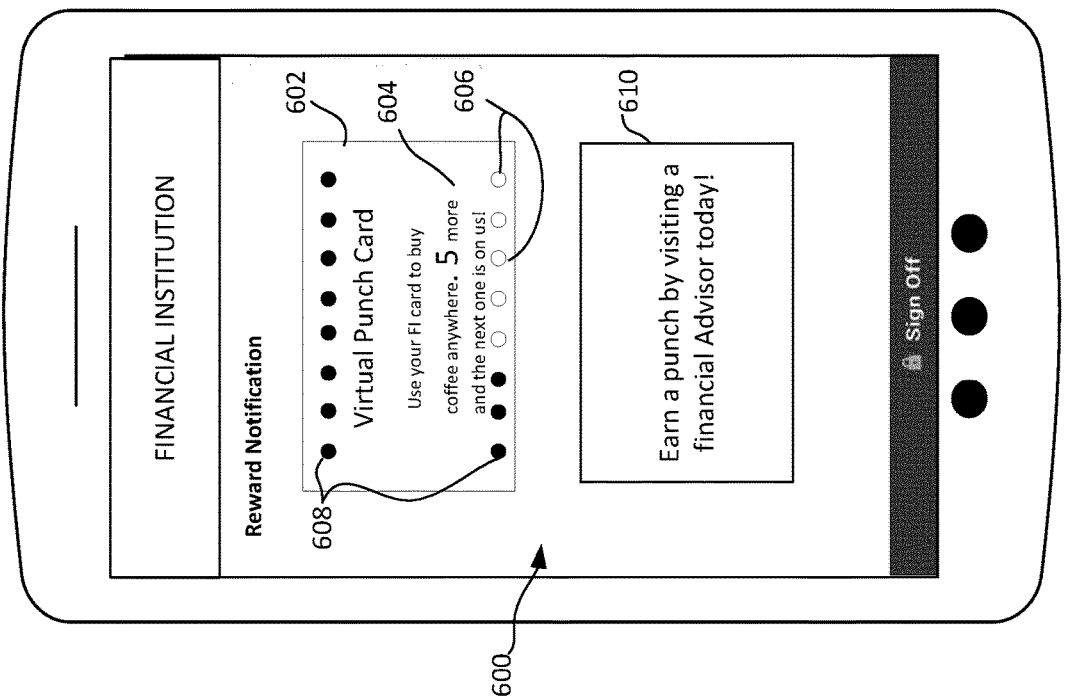
Figure 6C:
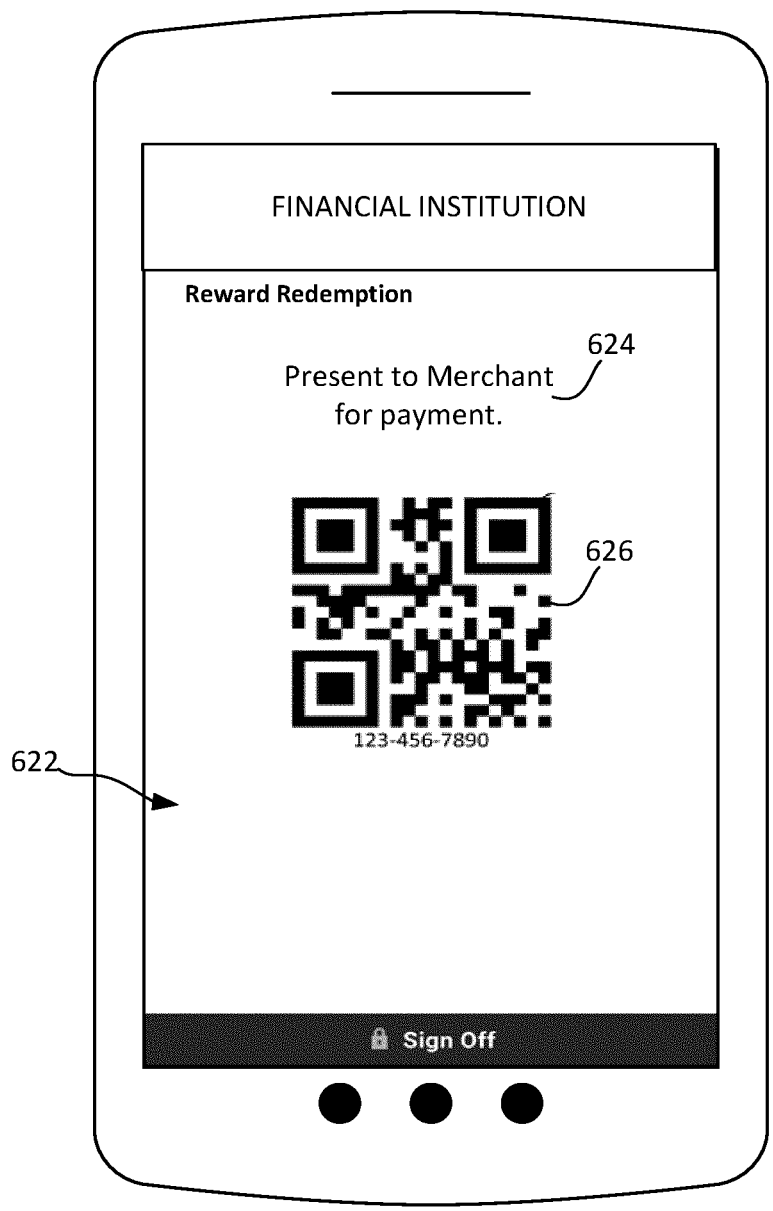

FIGS. 6a-6c show various interfaces presented to the user 110 during various implementations of the method 500 discussed above in relation to FIG. 5. As shown in FIG. 6a, an interface 600 is presented to the user 110 on the user computing device 114. In some arrangements, after updating the virtual punch card information to reflect a compatible transaction taking place, the financial institution computing system 142 is configured to transmit an update notification to the user computing device 114. The user 110, prompted by the notification, may log into the banking client application 124 to view the updated graphical interface 600 of the punch card generated at step 560 in the method 500 discussed above in relation to FIG. 5.

As shown in FIG. 6a, the interface 600 includes an updated punch card depiction 602. The updated punch card depiction 602 includes a punch card parameter description 604, unearned punch depictions 606, and earned punch depictions 608. The parameter description 604 describes the reward that the user 110 will earn if they complete the punch card, the number of punches that the user needs to get to earn the reward, and the types of transactions that will earn the user a punch. The unearned punch depictions 606 display to the user 110 the number of punches needed to earn the reward while the earned punch depictions 608 depict the number of punches earned by the user 110 since the virtual punch card was initiated (by e.g., the method 300 discussed above). In the updated interface 600, the punch depictions 602 and 606 are updated to reflect the user's progress towards earning the reward.

FIG. 6a also displays an additional punch card parameter 610 to the user 110. The additional punch card parameter 610 notifies the user 110 of an additional activity that may be engaged in to earn punches towards the identified reward.

Thus, responsive to the user 110 engaging in transactions compatible with the previously displayed punch card parameters, the financial institution computing system 142 may be configured to display further parameters so as to incentivize the user 110 to take actions with respect to the financial institution 140.

FIG. 6b shows an interface 612 presented to the user 110 via the user computing device 114. In some arrangements, the interface 600 is shown to the user 110 upon the reward generation system 156 (e.g., by the trigger detection circuit 240) determining that the user 110 has earned the requisite number of punches to earn a financial reward. The interface 600 includes completed punch card depiction 614 which includes a reward notification 616, as well as a reward payout option window 618. The completed punch card depiction 614 displays all of the punches as being earned as well as a reward notification 616, which notifies user 110 of the earned reward. The reward payout option window 618 prompts the user 110 to indicate whether they wish to redeem the earned financial rewards. The user 110, through the reward redemption button 620, can indicate a preference as to whether the reward is to be currently redeemed.

In some arrangements, if the user 110 indicates a preference to redeem the reward through the reward redemption button 620, they are brought to the interface 622 shown in FIG. 6c. FIG. 6c displays an interface 622 presented on the user computing device 114 including reward instructions 624 and a reward payment method 626. The reward instructions 624 instruct the user 110 regarding the next step to redeem the financial reward. The reward instructions 624 notify the user that the reward has been redeemed (e.g., where the earned reward takes the form of an updated account balance). In the case where the financial reward involves enabling the user 110 to pay for an identified transaction, the reward instructions 624 prompt the user 110 to take additional steps to redeem the reward. As shown, the reward instructions prompt the user 110 to present the payment method 626 to a merchant 130. As shown, the payment method 626 is a QR code through which the user can complete a previously identified transaction, by having the merchant 130 scan the QR code. As a person having ordinary skill in the art will appreciate, the appearance of the various depictions and graphics discussed herein will take on different forms based on the plurality of different implementations of virtual punch card systems.

Figure 7:
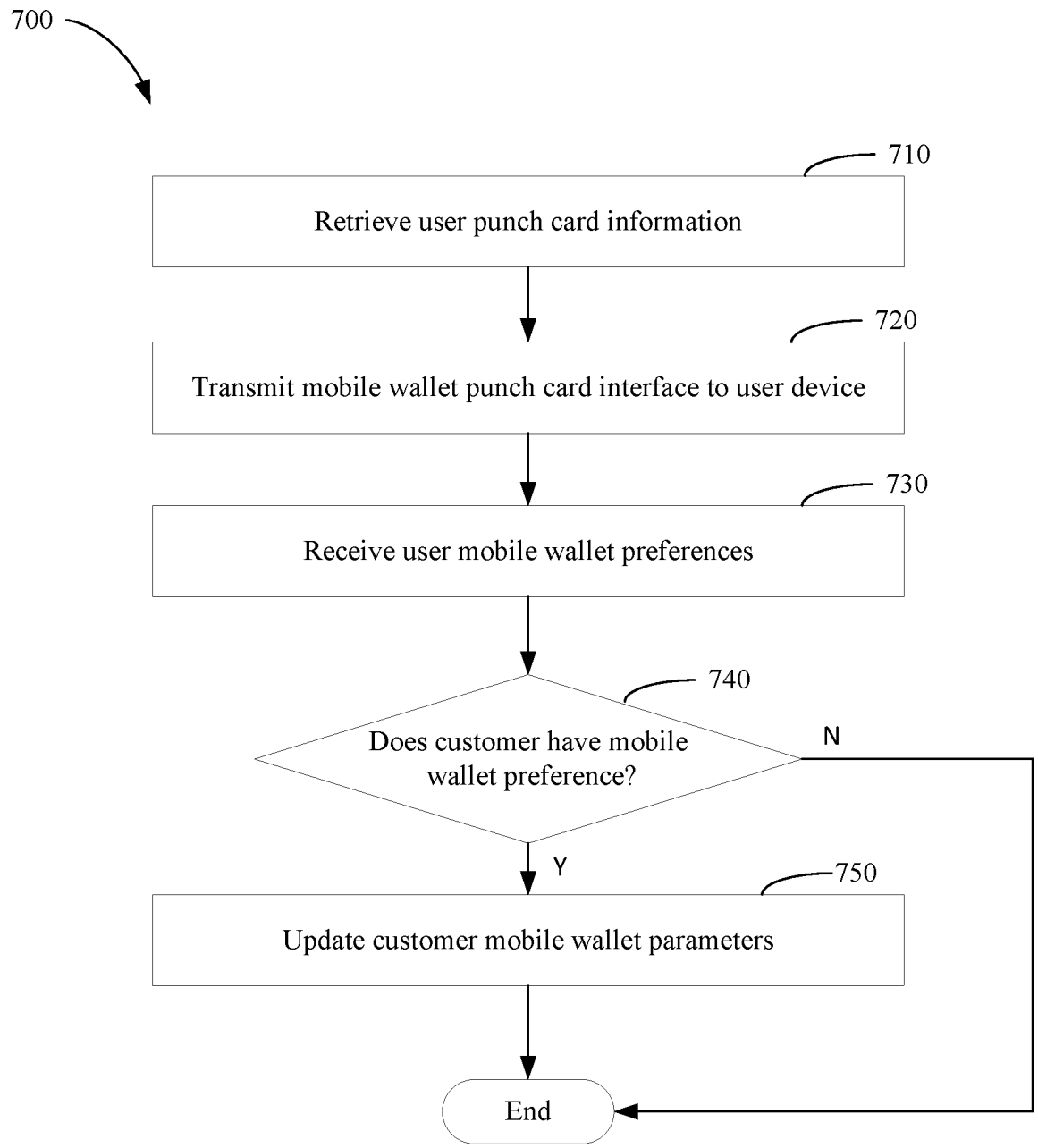
FIG. 7 shows a flow diagram of a method for updating user mobile wallet parameters to incorporate a user virtual punch card, according to an example embodiment.

Referring now to FIG. 7, a method 700 of setting up a virtual punch card as a payment default for a mobile wallet is shown according to an example embodiment. In various arrangements, the method 700 is performed by the financial institution computing system 142 through, for example, the reward generation system 156.

User punch card information is retrieved at 710. In various arrangements, a virtual punch card has been generated for the user 110 by any of the methods described herein. The financial institution computing system 142, via the reward generation system 156 (or a mobile wallet account management circuit) may be configured to retrieve the punch card parameters from either the user account database 150 or the reward database 260.

A mobile wallet punch card interface is generated and transmitted to the user at 720. The mobile wallet punch card interface provides the user 110 with the ability to set the payment account associated with the virtual punch card as a source account for conducting mobile wallet transactions. In some arrangements, the mobile wallet interface enables the user to set the payment account associated with the virtual punch card as a default source account for transactions conducted that will earn the user 110 a punch on the virtual punch card. The mobile wallet punch card interface may be viewable by the user 110 on the user computing device 114 via either the banking client application 124 or the mobile wallet client application 126. The financial institution computing system 142 (through, e.g., the reward generation system 156) may be configured to generate the graphical interface and transmit that graphical interface over the network 170 via the network interface 144. As discussed above, the banking client application 124 and the mobile wallet client application 126 may be communicatively coupled to one another so that a preference input by the user 110 on one application may be communicated to and applicable to the other.

In some arrangements, the mobile wallet interface also gives the user 110 the ability to input preferences pertaining to which transactions the payment account associated with the virtual punch card is to be used as the source account for mobile wallet transactions. The virtual punch card interface, for example, may present the 110 with several selectable merchant locations, giving the user 110 the ability to indicate which of the merchant locations to use the payment account for mobile wallet transactions.

User mobile wallet preferences are received at 730. For example, the banking client application 124 or the mobile wallet client application 126 may configure the user computing device 114 to transmit any user interactions with the mobile wallet punch card interface to the financial institution computing system 142 over the network 170.

It is determined if the user 110 indicated any mobile wallet preferences at 740. If, for example, no interaction of the user 110 with the mobile wallet punch card interface was received or the user indicated that they preferred to not set the virtual punch card as a mobile wallet default, the method 700 ends. In other situations, the reward generation system 156 may be configured to determine preferences input by the user 110 on the mobile wallet punch card interface such as user location preferences, indicating which merchant locations at which the virtual punch card is to be used as a mobile wallet default.

User mobile wallet parameters are updated at 750. The updated mobile wallet parameters may configure the user computing device 114 to transmit information identifying the payment card 112 associated with the virtual punch card (e.g., a payment token) to certain merchants. In some arrangements, the updated parameters configure the mobile wallet client application 126 to use the payment card 112 as a source account for mobile wallet transactions that are in conformance with the virtual punch card parameters set for the user. To illustrate, if a particular user has a virtual punch card reward that enable the user to earn rewards by engaging in transactions at coffee shops, the updated mobile wallet parameters may configure the mobile wallet client application 126 to use the credit card as a source account for customer transactions at coffee shops.

In some arrangements, the updated mobile wallet parameters includes a set of locations for various merchants. As discussed above, the user computing device 114 may be configured to transmit user location information to the financial institution computing system 142 when the user 110 engages in transactions at various merchants. Accordingly, in some arrangements, the updated virtual punch card parameters received at 750 may include the location information stored in association with the account of the user in the account database 150 or the reward database 260. The updated mobile wallet parameters may also include executable instructions that configure the user computing device 114 to only use the payment account associated with the virtual punch card as the source account when current location information (e.g., received from a GPS device associated with the user computing device 114) of the user matches the received location information. This way, the payment account associated with the virtual punch card will be used at a source account for the mobile wallet at locations that are predetermined by either the user 110 (by, e.g., preferences inputted by the mobile wallet punch card interface) or the financial institution 140.

Figure 8:
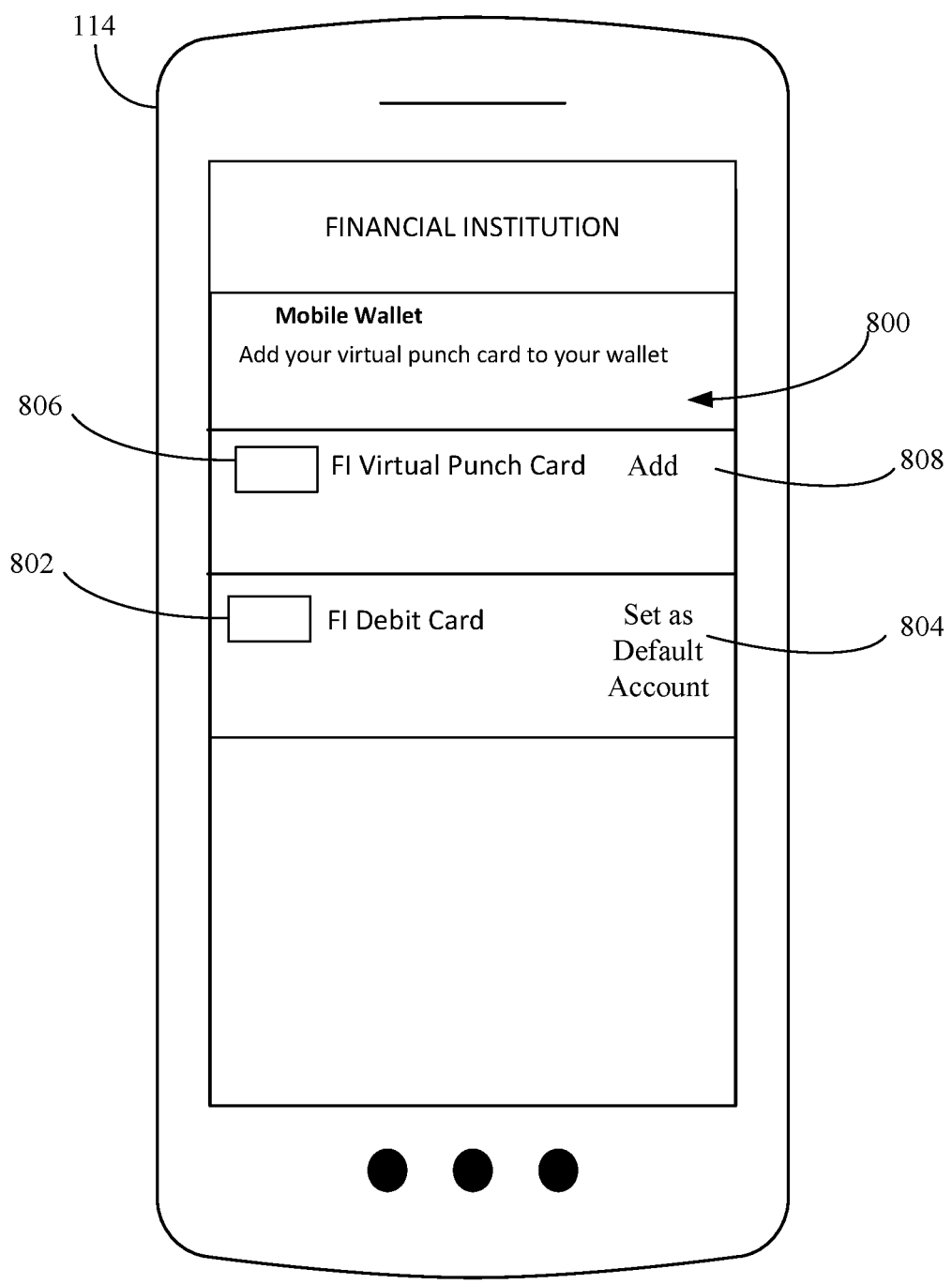
FIG. 8 shows an example interface presented to the user during the method shown in FIG. 7, according to an example embodiment.

Referring now to FIG. 8, an example virtual punch card mobile wallet interface 800 shown on the user computing device 114 is shown. The interface 800 may be presented to the user 110 while the mobile wallet client application 126 is being implemented on the user computing device 114. As shown, the interface 800 presents the user 110 with an account 802 and a virtual punch card account 806. The account 802 is an account held by the user 110 (e.g., associated with a debit card issued by the financial institution 140) that can potentially be used to conduct mobile wallet transactions. Associated with the account 802 default preference button 804. The default preference button 804 enables the user 110 to indicate a default source account to complete mobile wallet transactions. If the user uses the default button 804 to indicate a default preference, that payment account 802 will be used to complete every mobile wallet transaction that the user 110 engages in unless the user indicates another preference for a particular transaction. The virtual punch card account 806 notifies the user that they have a virtual punch card account with the financial institution 140. By pressing the add button 808, the user 110 can indicate a preference that they wish to use a payment account associated with the virtual punch to complete certain transactions. Upon selection of the add button 808, the user 110 may be brought to another interface giving the user the ability to indicate further preferences, such as which particular merchants they wish to use the virtual punch card as a mobile wallet payment method that overrides any other default payment account selected by the user 110.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system comprising:
a user database that stores user information concerning a plurality of users;
a network interface configured to communicate data over a network; and
a processing circuit comprising a processor and memory, the memory structured to store instructions that are executable by the processor and cause the processing circuit to:
receive transaction information concerning a payment account belonging to a user;
determine a first reward category for the user based on the retrieved transaction information;
generate virtual punch card parameters for the user based on the first reward category;
transmit, by the network interface over the network, virtual punch card content to a computing device associated with the user, the virtual punch card content including a first graphical interface configured to present the user with at least one of the generated virtual punch card parameters;
monitor, by a trigger detection circuit, the computing device associated with the user to determine how frequently the user engages in a transaction that conforms with the virtual punch card parameters;
based on monitoring the computing device associated with the user, detect a pattern in user transaction data including determining whether the user has failed to engage in the transaction that conforms with the virtual punch card parameter;
selectively generate a second reward category, different from the first reward category, the second reward category generated responsive to at least one of:
receiving, by the network interface over the network, an indication of the second reward category such that the second reward category is generated based on the indication of the second reward category;
receiving, by the network interface over the network, an indication that the user does not accept the first reward category, wherein the second reward category is generated based on the detected pattern in user transaction data;
prior to a fulfilment of the virtual punch card, determine a modification to the virtual punch card parameters based on at least one of the detected pattern in user transaction data and the second reward category, wherein the virtual punch card parameters comprise a financial reward viewable by the user, a number of punches required, a minimum transaction value, and a merchant category;
transmit, by the network interface over the network, updated virtual punch card content to the computing device associated with the user, the updated virtual punch card content including a second graphical interface configured to present the user with at least one of the updated virtual punch card parameters;
determine, based on the generated virtual punch card parameters and the received transaction information pertaining to a recent transaction of the user, whether the user has earned the financial reward; and
transmit, by the network interface over the network, responsive to determining that the user has earned the financial reward, financial reward redemption content to the computing device associated with the user, the financial reward redemption content comprising a third graphical interface structured to present the user with quick response (QR) code to redeem the earned financial reward.

2. The system of claim 1, further comprising a merchant database that stores information identifying merchant categories, wherein the received transaction information includes a plurality of payment requests received from multiple merchant computing systems, the multiple merchant computing systems being associated with a plurality of merchants, wherein each merchant in the plurality of merchants is associated with a merchant category.

3. The system of claim 2, wherein the determining of the reward category includes identifying the merchant categories of the plurality of merchants.

4. The system of claim 3, wherein the determining of the reward category further includes associating each of the received payment requests with the identified merchant category of the merchant that each of the received payment requests was received from.

5. The system of claim 4, wherein the determining of the reward category further includes determining at least one of the number of received payment requests that are associated with each merchant category and an aggregate monetary amount of all of the payment requests associated with each merchant category.

6. They system of claim 5, wherein the reward category is the merchant category that is associated with at least one of the merchant category that is associated with the highest number of received payment requests and the merchant category that is associated with the highest aggregate monetary amount.

7. The system of claim 2, wherein the generated virtual punch card parameters include a quantity of transactions that the user must engage in to earn a financial reward.

8. The system of claim 7, wherein the quantity of transactions specifies a restriction on a type of transactions that the user can engage in to earn a financial reward.

9. The system of claim 8, wherein the restriction includes a particular merchant category such that the user must engage in the quantity of transactions at merchants being associated with the particular merchant category to earn the financial reward.

10. The system of claim 9, wherein the particular merchant category is the reward category.

11. A method comprising:
receiving, by a processor of a financial institution computing system associated with a financial institution, transaction information concerning a payment account associated with a user;
determining, by the processor, a first reward category for the user based on the received transaction information;
generating, by the processor, virtual punch card parameters for the user based on the first reward category;
transmitting, by the processor, virtual punch card content to a communication device associated with the user, wherein the virtual punch card content includes a first graphical interface configured to present the user with at least one of the generated virtual punch card parameters;
monitoring, by a trigger detection circuit, a computing device associated with the communication device associated with the user to determine how frequently the user engages in a transaction that conforms with the virtual punch card parameters;
based on monitoring the communication device associated with the user, detecting, by the processor, a pattern in user transaction data including determining whether the user has failed to engage in the transaction that conforms with the virtual punch card parameters;
selectively generating a second reward category, different from the first reward category, the second reward category generated responsive to at least one of:
receiving, by a network interface over a network, an indication of the second reward category such that the second reward category is generated based on the indication of the second reward category;
receiving, by the network interface over the network, an indication that the user does not accept the first reward category, wherein the second reward category is generated based on the detected pattern in user transaction data;
prior to a fulfilment of the virtual punch card, determining, by the processor, a modification to the virtual punch card parameters based on at least one of the detected pattern in user transaction data and the second reward category, wherein the virtual punch card parameters comprise a financial reward viewable by the user, a number of punches required, a minimum transaction value, and a merchant category;
transmitting, by the processor, updated virtual punch card content to the computing device associated with the user, the updated virtual punch card content including a second graphical interface configured to present the user with at least one of the updated virtual punch card parameters
determining, by the processor and based on the generated virtual punch card parameters and the received transaction information pertaining to a recent transaction of the user, whether the user has earned the financial reward; and
transmitting, by the processor, responsive to determining that the user has earned the financial reward, financial reward redemption content to the computing device associated with the user, the financial reward redemption content comprising a third graphical interface structured to present the user with quick response (QR) code to redeem the earned financial reward.

12. The method of claim 11, wherein the received transaction information includes a plurality of payment requests received from multiple merchant computing systems over a network by a network interface, the multiple merchant computing systems being associated with a plurality of merchants, wherein each merchant in the plurality of merchants is associated with a merchant category.

13. The method of claim 12, further comprising identifying, by the processor, the merchant categories of the plurality of merchants, wherein the determining of the reward category for the user comprises:
associating, by the processor, each of the received payment requests with the identified merchant category of the merchant that each of the received payment requests was received from; and
determining, by the processor, at least one of the number of received payment requests that are associated with each merchant category and an aggregate monetary amount of all of the payment requests associated with each merchant category.

14. The method of claim 11, wherein the generated virtual punch card parameters provide a quantity of transactions that the user must engage in to earn a financial reward, the quantity of transactions specifying a restriction on a type of transactions that the user can engage in to earn a financial reward.

15. A system comprising:
a user database that stores user information concerning a plurality of users;
a merchant database that stores information identifying merchant categories and received transaction information comprising a plurality of payment requests received from multiple merchant computing systems, the multiple merchant computing systems being associated with a plurality of merchants, wherein each merchant in the plurality of merchants is associated with a merchant category;

a network interface configured to communicate data over a network; and a processing circuit comprising a processor and memory, the memory structured to store instructions that are executable by the processor and cause the processing circuit to:

receive transaction information concerning a payment account belonging to a user;

determine a first reward category for the user based on the received transaction information;

generate virtual punch card parameters for the user based on the first reward category, wherein the virtual punch card parameters comprise at least one of:

a quantity of transactions that the user must engage in to earn a financial reward, a time limit for earning a requisite number of transactions, activities that will be considered a transaction in the reward category, a reward received when the user earns the requisite number of transactions;

transmit, by the network interface over the network, virtual punch card content to a computing device associated with the user, the virtual punch card content comprising a first graphical interface configured to present the user with at least one of the generated virtual punch card parameters;

monitor, by a trigger detection circuit, the computing device associated with the user to determine how frequently the user engages in a transaction that conforms with the virtual punch card parameters including determining whether the user has failed to engage in the transaction that conforms with the virtual punch card parameters;

selectively generate a second reward category, different from the first reward category, the second reward category generated responsive to at least one of:

receiving, by the network interface over the network, an indication of the second reward category such that the second reward category is generated based on the indication of the second reward category;

receiving, by the network interface over the network, an indication that the user does not accept the first reward category, wherein the second reward category is generated based on the detected pattern in user transaction data;

based on monitoring the computing device associated with the user, detect a pattern in user transaction data;

prior to a fulfilment of the virtual punch card, determine a modification to the virtual punch card parameters based on at least one of the detected pattern in user transaction data and the second reward category, wherein the virtual punch card parameters comprise a financial reward viewable by the user, a number of punches required, a minimum transaction value, and a merchant category;

transmit, by the network interface over the network, updated virtual punch card content to the computing device associated with the user, the updated virtual punch card content including a second graphical interface configured to present the user with at least one of the updated virtual punch card parameters;

determine, based on the generated virtual punch card parameters and the received transaction information pertaining to a recent transaction of the user, whether the user has earned the financial reward; and transmit, by the network interface over the network, responsive to determining that the user has earned the financial reward, financial reward redemption content to the computing device associated with the user, the financial reward redemption content comprising a third graphical interface structured to present the user with quick response (QR) code to redeem the financial reward.

* * * * *